United States Patent
Banet et al.

[11] Patent Number: 6,122,064
[45] Date of Patent: Sep. 19, 2000

[54] METHOD FOR MEASURING THICKNESS OF FILMS

[75] Inventors: Matt John Banet, Boston; Robin Anne Sacco, Franklin, both of Mass.

[73] Assignee: Philips Electronics North America Corporation, New York, N.Y.

[21] Appl. No.: 09/322,821

[22] Filed: May 28, 1999

[51] Int. Cl.[7] .................................................. G01B 11/00
[52] U.S. Cl. ...................... 356/381; 356/382; 250/559.27
[58] Field of Search ....................... 356/381, 382, 356/372, 318; 250/559.19, 559.29, 550.27; 73/800

[56] References Cited

U.S. PATENT DOCUMENTS

| | | | |
|---|---|---|---|
| 5,120,966 | 6/1992 | Kondo | 356/381 |
| 5,546,811 | 8/1996 | Rogers et al. | 73/800 |
| 5,555,474 | 9/1996 | Ledger | 356/382 |
| 5,633,711 | 5/1997 | Nelson | 356/318 |
| 5,812,261 | 9/1998 | Nelson et al. | 356/318 |

OTHER PUBLICATIONS

U.S. application No. 09/067,411 entitled "Method andDevice for Measuring the Thickness of Thin Films Near A Sample's Edge and in a Damascene–type Structure".

*Primary Examiner*—Hoa Q. Pham
*Assistant Examiner*—Sang H. Nguyen
*Attorney, Agent, or Firm*—Tony E. Piotrowski

[57] ABSTRACT

Film thickness variation is measured in a region determined to be particularly non-uniform. Preferably the region is a donut entirely disposed within 15 mm of the edge of the film. Preferably the measurements are effected by and ISTS apparatus. The method is particularly well adapted to copper films deposited by ECD.

23 Claims, 5 Drawing Sheets

METHOD FOR MEASURING THICKNESS OF FILMS

BACKGROUND OF THE INVENTION

A. Field of the Invention

The invention relates to measuring variations in a film.

B. Background

During fabrication of microelectronic devices, thin films of metals and metal alloys are deposited on silicon wafers for use as electrical conductors, adhesion-promoting layers, and diffusion barriers. Thickness variations in the metal films can modify their electrical and mechanical properties, such as resistance-capacitance delay and photolithography resolution, thereby affecting the performance of the devices in which they are used. In electro-chemically deposited (ECD) copper films, for example, thickness variations are commonplace.

After these films are deposited, they can be subject to processes such as chemical-mechanical polishing (CMP) that modify their thickness and uniformity. In particular, uniformity is an important property that must be closely controlled in order to assure uniform behavior of the individual microelectronic devices. Generally, film thickness at any point on the film must be within a few percent of the mean film thickness to be considered uniform enough for use in semiconductor manufacturing. Because of these rigid tolerances, thickness and uniformity measurements are often used as quality-control parameters during and/or after the microprocessor's fabrication.

On method of generating thickness and uniformity measurements is called Impulsive Stimulated Thermal Scattering (ISTS), which is described, for example, in pending and issued U.S. Pat. No. 5,633,711 (entitled MEASUREMENT OF MATERIAL PROPERTIES WITH OPTICALLY INDUCED PHONONS); U.S. Pat. No. 5,546,811 (entitled OPTICAL MEASUREMENT OF STRESS IN THIN FILM SAMPLES); and U.S. Pat. No. 5,812,261 (entitled METHOD AND DEVICE FOR MEASURING THE THICKNESS OF OPAQUE AND TRANSPARENT FILMS), the contents of which are incorporated herein by reference. In ISTS, a first laser pulse initiates a sound wave that propagates in a plane of the film. A second laser pulse measures a frequency of the sound wave. The frequency of the sound wave relates to film thickness.

Another thickness measurement device is the four point probe, for instance the products sold under the trade name PROMETRICS - RS by KLA Tencor.

Typically film measurements are made along a line spanning a diameter or edge of the film, a concentric circular pattern over the entire surface of the film, or at random points on the surface of the film.

In most semiconductor manufacturing processes, time is at a premium. The less time spent on each device, the more devices can be produced with a particular item of equipment. The more devices can be produced with that item, the lower the costs of production.

Traditionally, measurement of the thickness of films in microelectronic devices has been considerably slower than the production of the films. Accordingly, manufacturers have elected to measure only some of the films produced, i.e. a type of spot checking. For instance, with respect to copper films, manufacturers have typically measured only one out of every 13 films. This results in considerable uncertainty as to the quality of the other films.

SUMMARY

It is an object of the invention to reduce the number of measurements made to determine thickness variations of a film, especially metal or metal alloy films.

This object has been achieved as a result of the surprising discovery by the inventors, after considerable experimentation, that, for a given film deposition technique, significant non-uniformities of such films are typically only observable at positions characteristic of the deposition technique. In particular, in some electro-chemically deposited (ECD) copper films, the films are formed by placing an electrode on a "seed" copper film, and then placing the film in a solution containing copper ions. The electrodes result in non-uniform deposition near the film's edges, but not elsewhere. An edge measurement can then quickly generate thickness and uniformity measurements around the perimeter of the film to determine these non-uniformities, also referred to herein as thickness variations. These data can then be analyzed to determine processing conditions by which this phenomenon can be resolved. The central portion of the films, particularly copper films, are typically of sufficient quality that they do not need to be measured.

According to the preferred embodiment of the invention, a multi-point measurement is made within a region near the edge bounded by an inner shape and an outer shape that completely surrounds the inner shape. The inner shape could be a circle, an ellipse, a multi-sided shape, or any simple, closed curve that does not cross itself. The outer shape is also any simple, closed curve that does not cross itself. The region may be referred to as a "donut".

Many prior art thickness measurement techniques are not suitable for edge measurements. For instance, the four point probe, due to its large measurement area, typically cannot measure the outer 5–10 mm of a sample. However, ISTS is an all-optical technique having a small (e.g., tens of microns) spot size. This means that it can measure a film out much closer to its edge, as described, e.g. in U.S. Ser. No. 09/067,411 (entitled METHOD AND DEVICE FOR MEASURING THE THICKNESS OF THIN FILMS NEAR A SAMPLE'S EDGE AND IN A DAMASCENE-TYPE STRUCTURE).

Measuring only around the edge of a sample results in a geometrical savings of time. Let us take the case of a prior art measurement on a sample using 49 measurement points. These points would typically be placed in concentric patterns. For instance, point 1 would be in the center, points 2–9 would be in a first ring, points 10–26 would be in a second ring, and points 27–49 would be in the outer ring. Under the invention, only the outer ring of points would need to be used, resulting in approximately a 50% time savings. The manufacturer would then be able to measure the thickness of twice as many samples as previously.

Film processing techniques such as CMP, which smooth out non-uniformities, are especially aided by the invention. For example, the method of the invention for determining film uniformity near the film's edge prior to CMP allows for predetermination of polishing conditions for an ECD copper film.

Alternatively, rather than reducing the number of measurements a manufacturer might use the same number of measurement points could be used as before, but concentrated in the donut, ignoring the center portion of the sample. This would result in a measurement that selectively samples the regions of the film that are typically the most non-uniform, i.e. the edge regions. Compared to using the same number of measurement points scattered over the whole sample, this technique results in a more useful characterization of the film.

Due to the unique shape of the measurement pattern and the small measurement spot size, the film may be measured to its edge and along its entire perimeter. Since the measurement technique provides an accuracy and repeatability on the angstrom scale, uniformity can be even more closely monitored, quickly checking whether a film is globally planar (defined as when any given point on a film is within 85–90% of the mean thickness of the film).

Another alternative would be to conduct most measurements within the region of non-uniformity and to conduct substantially fewer in other areas of the film. For instance only one point might be measured in the center of the film, while 48 points are measured around the perimeter.

Other features, aspects, and advantages of the invention follow from the following detailed description, and from the claims.

BRIEF DESCRIPTION OF THE DRAWINGS

The invention will now be described by way of non-limitative example with reference to the following figures.

DETAILED DESCRIPTION

Figure 1:
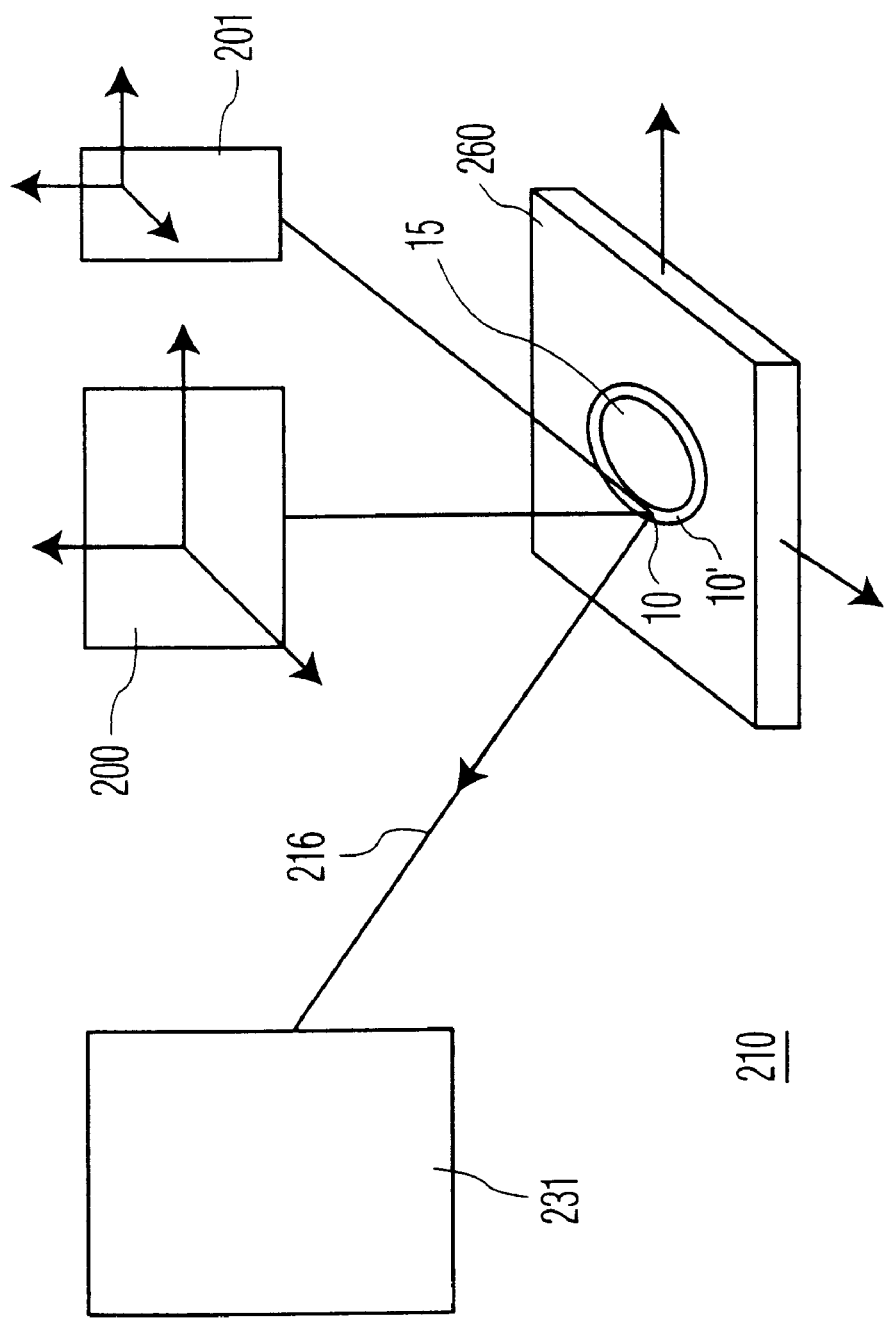
FIG. 1 is an optical system for generating thickness measurements of FIG. 2.

Referring to FIG. 1, an optical system 210 measures the thickness of a film 15 deposited on a stage 250. Similar optical systems are described in pending and issued U.S. Pat. No. 5,633,711 (entitled MEASUREMENT OF MATERIAL PROPERTIES WITH OPTICALLY INDUCED PHONONS); U.S. Pat. No. 5,546,811 (entitled OPTICAL MEASUREMENT OF STRESS IN THIN FILM SAMPLES); and U.S. Pat. No. 5,812,261 (entitled METHOD AND DEVICE FOR MEASURING THE THICKNESS OF OPAQUE AND TRANSPARENT FILMS), the contents of which have been previously incorporated herein by reference. The system features an excitation source 200 that irradiates film 15 in a measurement point 10. This excitation excites an acoustic mode that originates within measurement point 10 and propagates outward. A probe radiation source 201 irradiates measurement point 10 to measure the acoustic mode and generates a signal beam 216. An analyzer 231 analyzes the signal beam 216 to determine a property (e.g., thickness) of the structure in the measurement point 10. Stage 250 then translates, or excitation source 200 and probe source 201 translate and a second measurement point 10' is irradiated with the excitation source 200 and probe source 201 to determine a property (e.g., thickness) of the structure at measurement point 10'.

Figure 2:
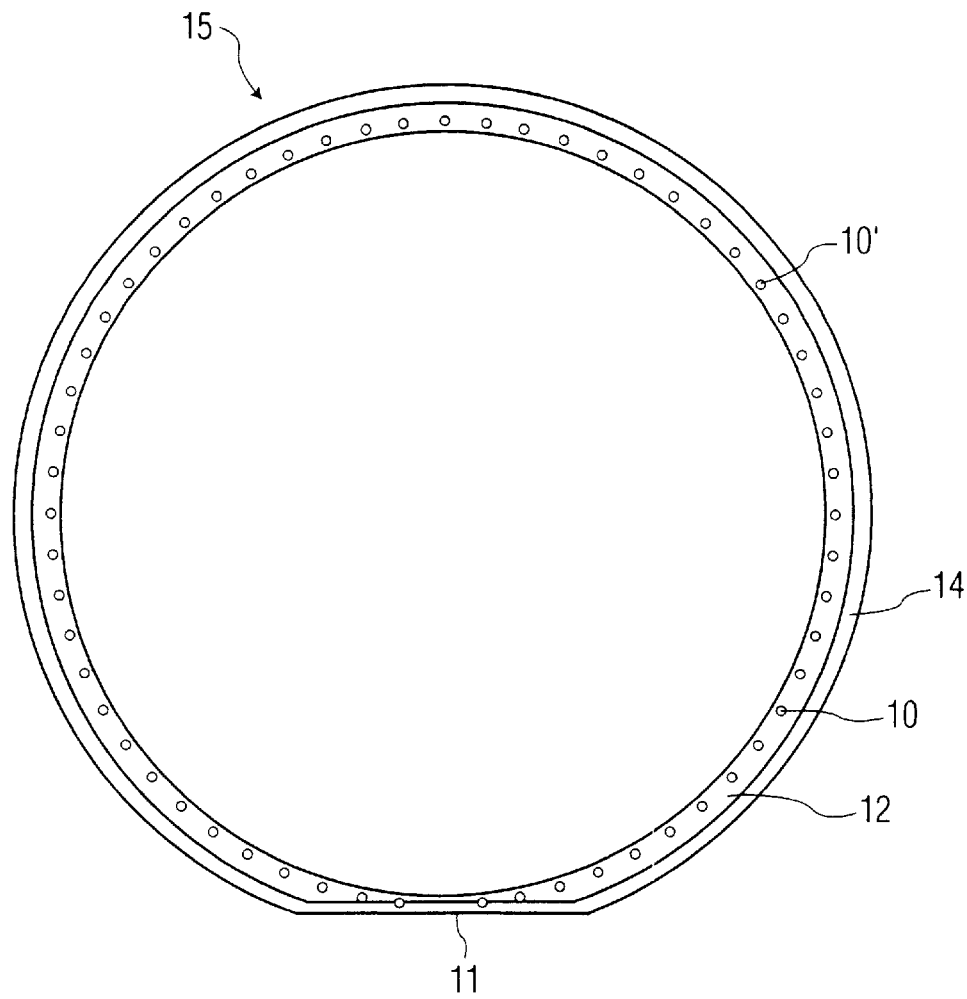
FIG. 2 is a top view of a measurement pattern occurring at multiple points around the perimeter of a film.

Referring to FIG. 2, the apparatus of FIG. 1 generates a multi-point measurement, (e.g., an ISTS measurement) of thickness values over a region 12 on film 15. Uniformity can be calculated from the multiple thickness measurements. The total area of the region, or donut, 12 preferably should include less than 50% of the surface area of the film. Each measurement point 10, 10' occurs within region 12, preferably around the entire perimeter of the film 15 near its edge 11. For the purpose of this application, "near" will mean that the entire region 12 is preferably less than 15 mm from the edge, but at most 50 mm from the edge. At least two points can constitute a region. In the preferred embodiment, the region 12 follows the shape of edge 11 of film 15. Region 14, between the edge 11 of the film 15 and region 12, indicates an edge-exclusion zone as described in U.S. Ser. No. 09/067,411 (METHOD AND DEVICE FOR MEASURING THE THICKNESS OF THIN FILMS NEAR A SAMPLE'S EDGE AND IN A DAMASCENE-TYPE STRUCTURE) the contents of which are previously incorporated by reference. Region 12 is bounded by the edge-exclusion zone 14.

Figure 3:
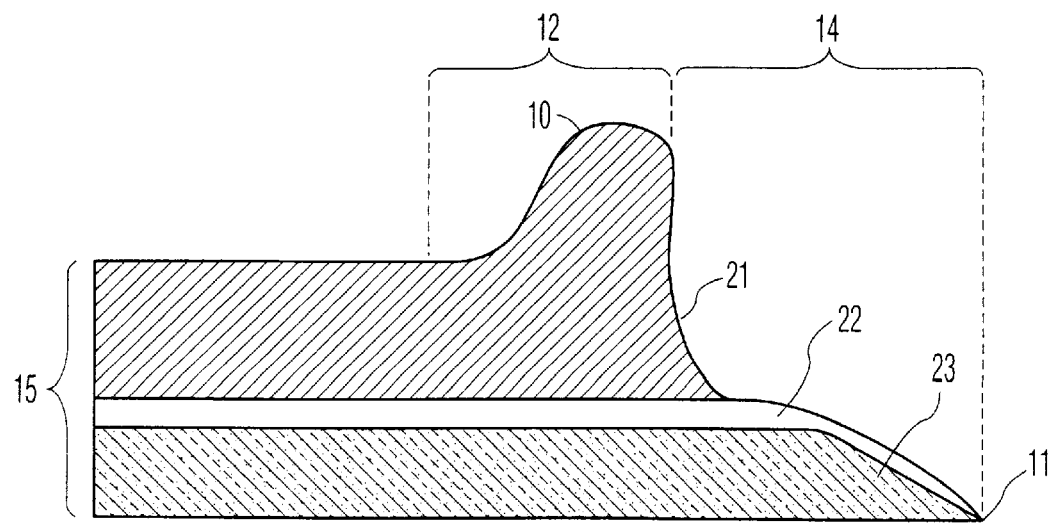
FIG. 3 is a schematic side view of a wafer supporting a thin film.

Referring to FIG. 3, a schematic side view of a wafer 23 supporting a metal layer 21 displays the components of film 15. An adhesion layer 22 is disposed underneath the deposited metal layer 21. A single measurement point 10 occurs on the surface of metal film 21 within the region 12 to generate a thickness value. Multiple measurements made around the entire perimeter of the film 15 can be analyzed to determine the uniformity of the film up to the edge-exclusion zone 14. Since the majority of the surface of the film is relatively uniform, only region 12 needs to be measured in order to accurately determine processing conditions for film 15.

A few measurements might be made outside the region 12 to verify the thickness elsewhere. Preferably, however, substantially all the measurements are made in the region 12, where "substantially all" means more than 75%.

Figure 4:
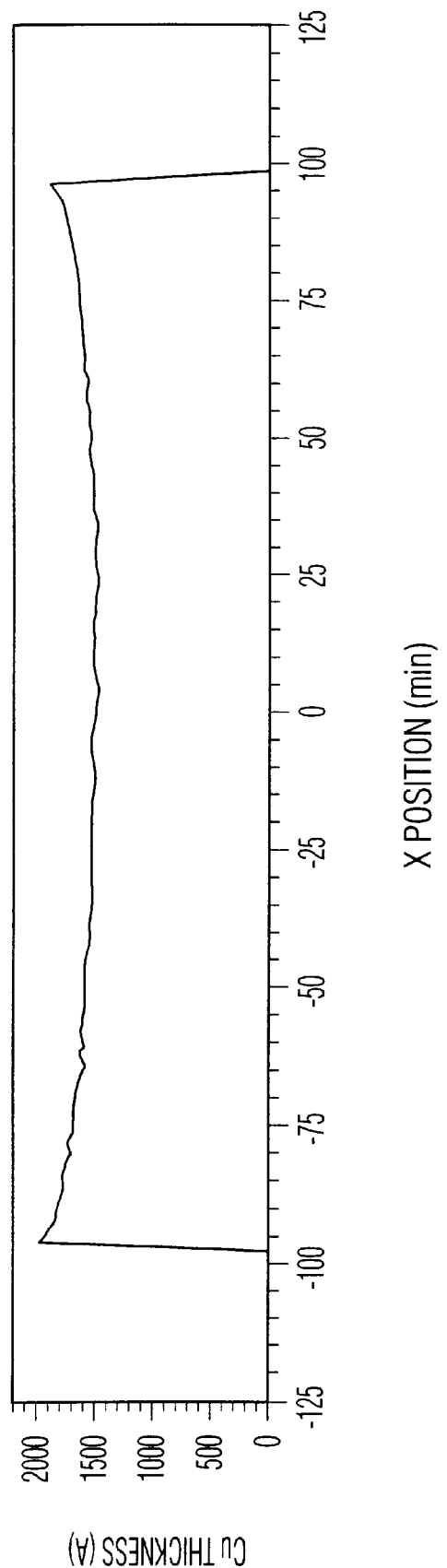
FIG. 4 is a side view of an ECD copper film near the edge of a wafer.
Figure 5:
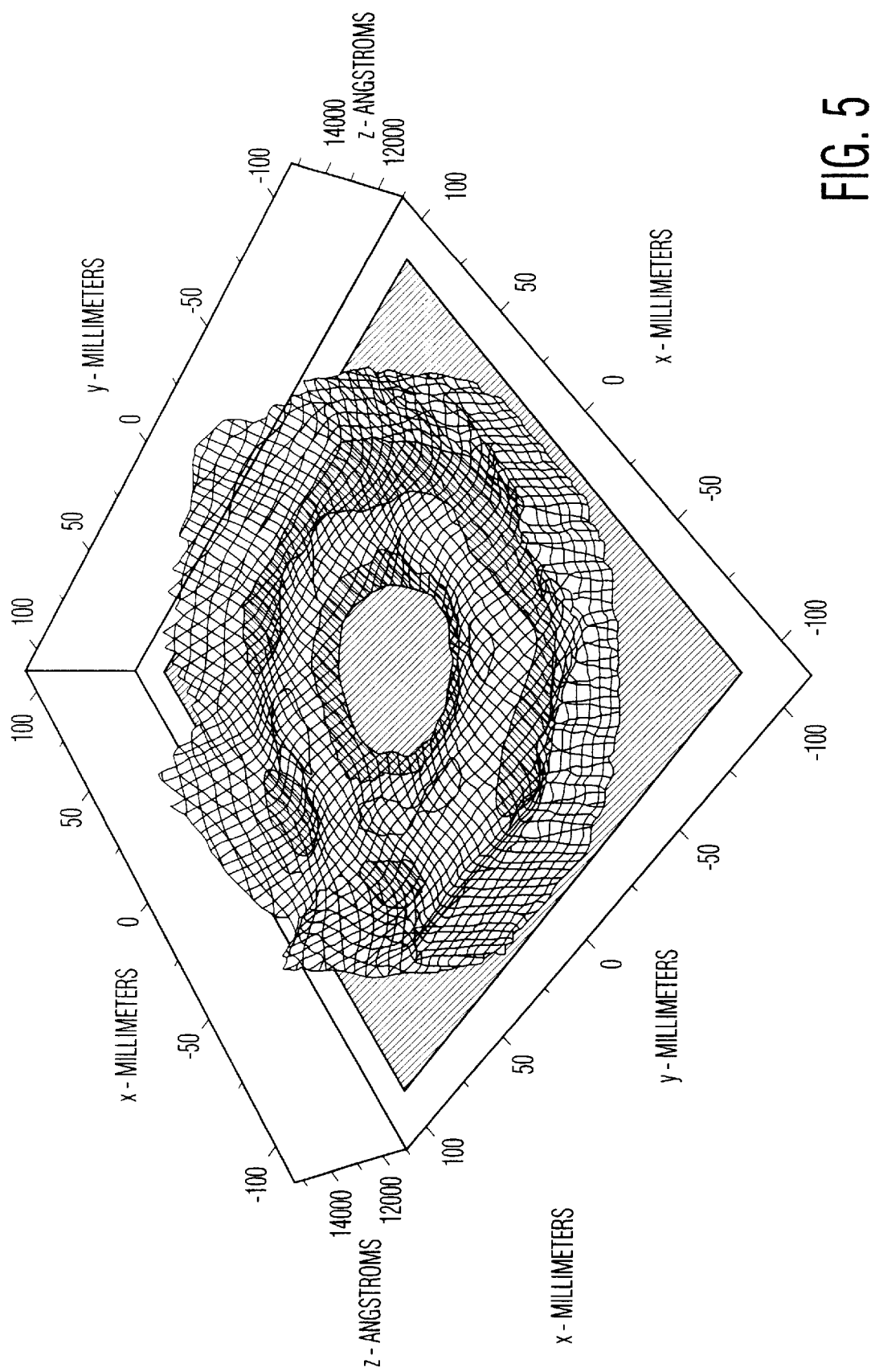
FIG. 5 is a contour map of the ECD copper film of FIG. 4.

Referring to FIGS. 4 and 5, a side view of an ECD copper film near the edge of a wafer and a contour map of the ECD copper film display non-uniform deposition than typically occurs near the edge of an ECD film. The measurement technique described herein quickly measures this type of film by measuring the uniformity of the entire perimeter, generally where the non-uniform surface is most variable. For example, in FIG. 4, measurement need only be made of the film from approximately −97 mm to −85 mm and from 85 mm to 97 mm in the x-position to determine processing requirements. This is also evident in FIG. 5, where the outer portions of film 15 are non-uniform.

After uniformity is determined, film processing to techniques such as CMP can be undertaken, responsive to the uniformity measurements.

Other Embodiments

Figure 6A:
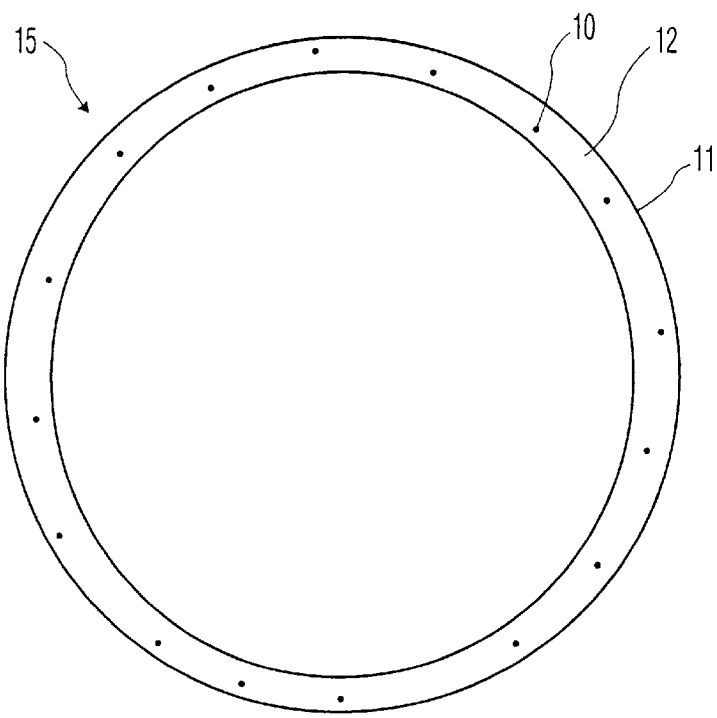
FIGS. 6a–6b are respectively, alternate measurement patterns that can be used to determine film uniformity near the film's edge, or in a localized area.
Figure 6B:
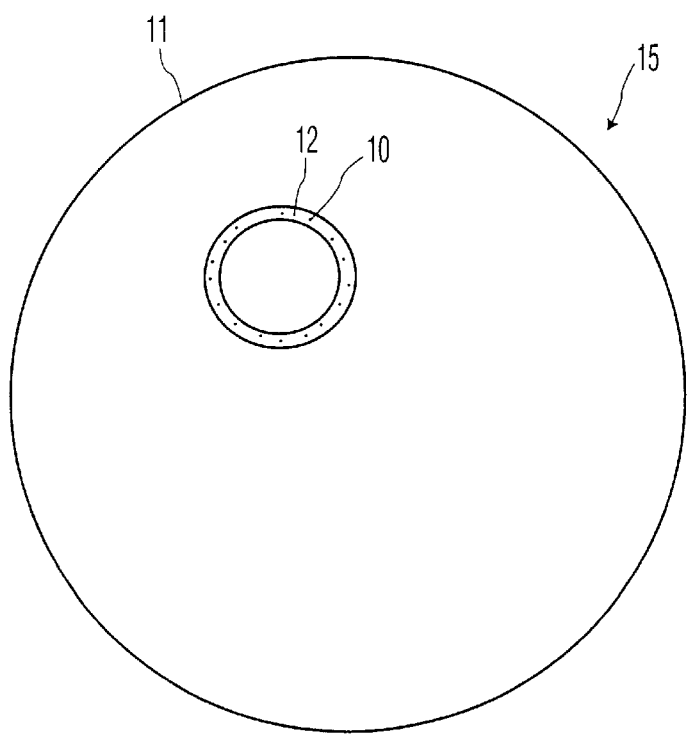

Using the technique described above, other non-uniform regions of films can be rapidly measured. Referring to FIGS. 6a and 6b, a multi-point measurement technique measures thickness and uniformity values over the region 12. Each measurement point 10 occurs within region 12 around the entire perimeter of the film 15 at its edge 11 (i.e., also measuring the edge-exclusion zone), in the case of FIG. 6a; and around a local region of the film, in the case of FIG. 6b.

Realization of measurement within the region 12 can be achieved by software control.

Still other embodiments are within the scope of the following claims. The word "comprises" as used herein is not intended to exclude the addition of other elements beyond the claimed elements.

What is claimed is:

1. A method for determining thickness variations in a film comprising:

defining a region of the film, the region being at least 50% less than an entire surface area of the film, the region being known to comprise more thickness variations than areas of the film outside the region; and measuring a thickness of the film at a plurality of points within the region, while conducting less measurements in the areas outside the region, wherein the region comprises an inner shape and an outer shape that at least partially surrounds the inner shape.

2. The method of claim 1 wherein the region is a donut.

3. The method of claim 1 wherein the donut is located substantially around a perimeter of the sample.

4. The method of claim 1, wherein the donut is substantially located with 15 mm of the perimeter.

5. The method of claim 1 wherein the region comprises less than 50% of an entire surface area of the film.

6. The method of claim 1 wherein the measuring is effected by an ISTS apparatus.

7. The method of claim 1, wherein the inner shape has a perimeter less than a perimeter of the outer shape and the outer shape having a perimeter no larger than the perimeter of the film.

8. The method of claim 2, wherein the inner shape is substantially circular.

9. The method of claim 1, wherein measuring comprises:

exciting an acoustic mode in a first measurement point with at least one excitation source of radiation;

detecting the acoustic mode with a probe radiation source that irradiates the first measurement point to generate a diffracted signal beam;

analyzing the diffracted signal beam to determine the thickness of the film in the first measurement point; and repeating the exciting, detecting, and analyzing to determine the thickness of the film at a second measurement point.

10. The method of claim 9, wherein the method further comprises processing the thickness measurements to determine thickness variations.

11. The method of claim 10, wherein the exciting, detecting, analyzing, and translating are repeated until at least one thickness variation within the region is determined.

12. The method of claim 10, wherein the processing step further includes processing the thickness measurements to generate a measurement of thickness uniformity.

13. The method of claim 11, wherein the method further comprises analyzing the measurements of thickness uniformity to determine a set of processing conditions by which to process a film.

14. A method of processing a film, the method comprising
a. the method of claim 13; and
b. processing according to the set of processing conditions.

15. The method of claim 10, wherein the method further includes analyzing the thickness variations to determine a set of processing conditions by which to process a film.

16. The method of claim 15, wherein the film is processed according to the set of processing conditions.

17. The method of claim 1, wherein the film is measured before processing.

18. The method of claim 17, wherein the film is measured after processing.

19. The method of claim 1, wherein the film comprises a metal alloy.

20. The method of claim 19, wherein the film is copper deposited by ECD.

21. The method of claim 1, wherein the region definition being determined in accordance with a deposition technique by which the film was deposited.

22. A method for determining thickness variations in a film, the method comprising:

selecting a region on the film wherein an outer boundary of the region is disposed near the perimeter of the film, and an inner boundary of the region is disposed within about 50 mm from the perimeter of the film;

measuring a thickness value at a plurality of points substantially entirely within the region by first generating an acoustic response and then measuring and analyzing the acoustic response; and analyzing the thickness value at each of the plurality of points to determine the thickness variations of the film.

23. A method for determining thickness variations in a film, comprising the steps of:

identifying a region of the film that is likely to comprise more thickness variations than areas of the film outside the region;

defining a sub-portion of the region; and measuring a thickness of the film at a plurality of points within the sub-portion, while conducting less measurements in other areas of the film.

* * * * *